Jan. 10, 1956 A. M. WALLACE 2,730,135
TUBING OR METHOD OF MAKING TUBING
Filed Sept. 10, 1951
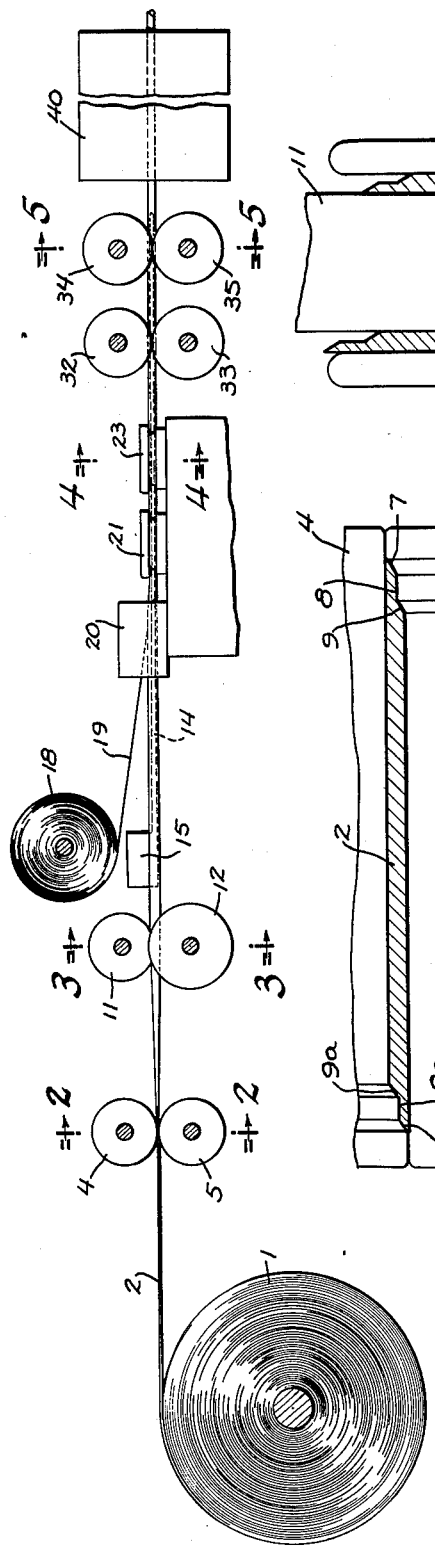
INVENTOR.
Arthur M. Wallace
BY
Barnes, Kisselle, Laughlin & Raisch
ATTORNEYS.

United States Patent Office 2,730,135
Patented Jan. 10, 1956

2,730,135

TUBING OR METHOD OF MAKING TUBING

Arthur M. Wallace, Detroit, Mich., assignor to Bundy Tubing Company, Detroit, Mich., a corporation of Michigan Application September 10, 1951, Serial No. 245,896

5 Claims. (Cl. 138—74)

This invention relates to tubing and to the method of making the tubing, and it is concerned particularly with tubing made from strip metal stock with a longitudinally running seam.

More particularly, the invention is directed to an improved tubing structure and method of making the same wherein the tubing has a seam with interfaces which are secured together by an added bonding metal such as a brazing or soldering metal. The tubing of this invention is preferably fashioned from strip metal stock into tubular form having a wall constituted by a single ply of the strip stock and wherein the edges of the strip stock are united at interfaces by brazing or soldering.

In a brazed or soldered joint or seam of this type, it is desirable to have a thin film of bonding metal between the parts which are thus joined together. In accordance with this invention, the bonding metal is positioned in the interfacial zone while in a solid state, and then is rendered molten for uniting the interfaces. A strip or ribbon of bonding metal for the purpose would be so thin and foil-like that it would be impractical to place it in the seam as it would not possess sufficient strength in itself to withstand the handling and other treatment present in the making of the tubing. Accordingly, this invention contemplates the employment of a carrier strip for the bonding metal and this carrier strip is incorporated into the seam.

The carrier strip is coated with the requisite thin coating of bonding metal and thus when the carrier strip is located in the seam between the edges of the strip stock of which the tube is made, the coating of bonding metal on the carrier strip is located and maintained between the interfaces. The carrier strip may be of the same metal as the strip stock of which the tubing is formed. The invention also aims to provide a seam construction wherein the width of the interfaces is such as to give the seam requisite strength. A preferred form of such seam is a form of scarfed seam.

The invention will be fully understood by a consideration of the following detailed description in conjunction with the accompanying drawings:

Fig. 1 is a general view of a schematic nature illustrating one sort of mechanism for the making of tubing of the present invention.

Fig. 2 is an enlarged cross sectional view taken substantially on line 2—2 of Fig. 1 showing the preliminary treatment of the strip stock.

Fig. 3 is an enlarged view taken substantially on line 3—3 of Fig. 1 showing a partial formation of the strip stock.

Fig. 4 is an enlarged view taken substantially on line 4—4 of Fig. 1 showing a further step in the formation of the tube and illustrating the seam insert or carrier strip.

Fig. 5 is an enlarged cross sectional view taken substantially on line 5—5 of Fig. 1 illustrating a final step in the formation of the tubing.

Fig. 6 is a view illustrating the completed tube.

Fig. 7 is an enlarged cross sectional view of the carrier strip and illustrating the coating of bonding metal therein.

The materials employed in making the tubing may vary. A good example, perhaps, is a tubing made of steel stock with a steel carrier strip with the interfaces copper-brazed together. The bonding metal may be substantially pure copper or copper alloyed with tin or zinc or other metals. The bonding metal may be a solder such as a hard solder of which silver solder is an example. The demarcation between a brazing metal and a hard solder may be vague or indistinct and, therefore, insofar as the present invention is concerned, it makes no difference whether the bonding metal be termed a brazing metal or a soldering metal. The material of the strip stock and the carrier strip may also vary and appropriate bonding metals may be employed which will perform satisfactorily with the material selected for the strip. It is convenient, perhaps, in considering the invention to visualize a tubing fashioned from strip steel stock with the interfaces copper brazed together.

The strip stock of which the tubing is made may lie in a coil 1 and the strip 2 may be drawn therefrom. A pair of forming rollers 4 and 5 may first act upon the strip stock to bevel the edges thereof as illustrated in Fig. 2. Preferably, the edges are treated to give them a double scarfed formation, each edge having an inclined or scarfed portion 7, an intermediate part 8 and an inner angularly disposed or scarfed portion 9. The other edge of the strip is similarly formed with portions 7a, 8a and 9a. The strip stock is pulled lengthwise from left to right as Fig 1 is viewed, and is fashioned into tubular form. Tube mills of this type and for this purpose are generally well known to those versed in the art and the illustration in Fig. 1 is largely schematic as aforesaid. Forming rollers 11 and 12 act upon the strip 2 and, as shown in Fig. 3, the strip is substantially in U-shape. An arbor shown in dotted lines in Fig. 1 and illustrated at 14, is supported at one end by a suitable bracket 15. This arbor extends within the tubing being formed.

While the strip is still in an open condition, the carrier strip is introduced. This carrier strip may be in a coil as shown at 18 and the strip 19 is drawn therefrom. The carrier strip may be guided by a guide device 20 and it is introduced into the seam at about the location of a pair of forming rollers positioned on vertical axes as shown at 21. Immediately downstream from the rollers 21 are two similar forming rollers 23 and 24 positioned on vertical axes and it will be seen how, by reference to Fig. 4, the carrier strip 19 is positioned so as to be ultimately located in the longitudinally running seam.

The carrier strip has a thickness of about one half the thickness of the strip 2 and may or may not be preformed to accurately fit the treated adges of the body strip. As shown herein the carrier strip 19 has its edges scarfed or disposed in an angular manner. The edges of the strip are provided with a coating of bonding metal as shown at 26 and 27 and opposite faces of the carrier strip are provided with a coating of bonding metal, as shown at 28 and 29. The bonding metal, as mentioned before, is so thin that a foil-like strip or ribbon would not have sufficient strength or body to be handled and placed into position between the edges of the strip 2. However, the carrier strip 19 has sufficient body and strength and thus it carries the bonding metal into position and retains it in position.

Downstream from the rollers 23 and 24 are forming rollers 32 and 33 which may substantially complete the formation of the strip 2 and rollers 34 and 35 may be compression rollers which compress the strip 2 and the carrier strip 19 about the arbor 14, as shown in Fig. 5. The strip 19, shown herein as not being preformed, is thus subjected to pressure and shaped to substantially fit against the preformed faces of the strip 2 and, indeed, the preformed surfaces of the scarfed edges of the strip 2 may be somewhat deformed. The cold working to which the metals are subjected results in the metals remaining in the position shown in Fig. 5.

When the tube forming strip and the carrier strip are thus compressed together, as indicated in Fig. 5, the bonding metal on the surfaces of the carrier strip is tightly engaged in interfacial relationship between the surfaces of the carrier strip and the surfaces of the edges of the strip 2. The coating at 26 is brought into interfacial relationship substantially with the scarfed portion 9a; some of the coating 28 is in interfacial relationship with the surfaces 7a and 8a and a part of the surface 28 is exposed on the exterior of the tube, as shown in Fig. 6. Similarly the coating 27 is brought into interfacial relationship substantially with the scarfed surface 9; some of the coating 29 is in interfacial relationship with the surfaces 8 and 9 and part of the coating 29 becomes a part of the interior surface of the tube. Because the carrier strip and the prepared edges of the strip 2 are deformed somewhat in the compression action, illustrated in Fig 5, there are no sharp division lines between the above described interfacial portions in the finished tube. In other words, the several surfaces of the edges of the strip 2 and the surfaces of the carrier strip are blended and merged into each other.

The thus formed tube may pass immediately into and through a suitable furnace or heating zone 40 in which zone bonding metal is melted so that upon cooling and solidification the interfaces are bonded together. The tubing may be cooled as it passes from the heating zone to the atmosphere, or it may be protected from the atmosphere until sufficiently cooled and the bonding metal solidified. While, as shown in the drawings, the entire tubing is passed through the heating zone with the result that the entire tubing is heated, it is only necessary to heat the portion of the tube at the seam in order to effect the braze. In other words, the tubing can be locally heated in the vicinity of the seam. Where the claims call for heating the tubing or subjecting the tubing to heat for brazing purposes, it is to be understood that such language covers the heating of the tubing only in the vicinity of the seam as well as heating the entire tubing. The finished tube may appear substantially as shown in Fig. 6. The joint is strong, however, because of the scarfed formation. In other words, each brazed joint has a width greater than the thickness of the wall of the tube. By providing the double scarf formation the width of the seam at the interfaces is sufficiently long to provide the desired strength without, however, having too sharp an angle at the tapered surfaces 7 and 7a. Thus, the extreme edge of the strip 2 is not reduced to an objectionable sharpness or thinness as might be the case with a single scarf. The pressure exerted by the pressure rolls 34 and 35, with the presence of the arbor 14, compresses and reduces slightly the intermediate portion of the carrier strip 19 so that it effectively remains in position.

In this manner of making such a tubing, the bonding metal is, as aforesaid, very thin and, therefore, there is no tendency for the metal to flow out from between the interfaces when it becomes molten. One reason for this may be that the spacing between the interfaces is so small that the molten metal remains in position by capillarity. It follows that the tubing is very clean both inside and outside with no excess droplets or pools of bonding metal on the outside or inside surfaces of the tubing. Moreover, the exposed portions of the side surfaces of the carrier strip are shaped to the contour of the interior and exterior surfaces of the strip 2 so that a well rounded tubing with smooth interior and exterior surfaces is provided.

I claim:

1. The method of making tubing which comprises, placing a double scarfed formation on opposite edges of a strip of metal stock, with each scarfed edge having angularly disposed surfaces and an intermediate surface substantially in the plane of the strip stock, fashioning the strip substantially into hollow cross sectional form to thus provide the major portion of the tubing, placing a carrier strip of metal stock, having a coating of bonding metal on opposite faces thereof, between the opposite scarfed edges of the first named strip, and with the coated faces in interfacial relationship with the scarfed faces of the opposite edges of the first named strip, the bonding metal being different from the metal of the strips, subjecting the said edges and the carrier strip to pressure to constrict the central part of the carrier strip and tightly engage the interfaces, subjecting the tubing to heat to melt the bonding metal and then cooling the tubing to solidify the bonding metal and unite the interfaces.

2. The method of making tubing which comprises, placing a double scarfed formation on opposite edges of a strip of metal stock, with each scarfed edge having angularly disposed surfaces and an intermediate surface substantially in the plane of the strip stock, fashioning the strip substantially into hollow cross sectional form to thus provide the major portion of the tubing, placing a metal carrier strip of metal stock, of substantially flat form with scarfed edges and having a coating of bonding metal on faces thereof, between the opposite scarfed edges of the first named strip, the bonding metal being different from the metal of the strips, subjecting the hollow cross sectional form and the carrier strip to pressure to deform the carrier strip so that coated faces come into interfacial relationship with the scarfed faces of the opposite edges of the first named strip, subjecting the tubing to heat to melt the bonding metal and then cooling the same to solidify the bonding metal and unite the interfaces.

3. The method of making tube which comprises, fashioning a strip of metal stock substantially into hollow cross sectional form to thus provide a major portion of the tubing, thinning the opposite edge portions of the strip, placing a relatively narrow strip of metal stock between the opposite edges of the first named strip with the thinned portion of one edge of the first named strip overlapping the second named strip on the outside and in interfacial relationship therewith and with the thinned portion of the opposite edge of the first named strip overlapping the second named strip on the inside and in interfacial relationship therewith leaving outside and inside surface portions of the second strip exposed so that they form outside and inside surface portions to the tube, the second named strip having on its surfaces, including its interfacial surfaces, a layer of solder or brazing metal which is bonded thereto, subjecting the opposite edges of the first named strip and second named strip to pressure to bring the interfaces into tight interfacial relationship, heating the tubing to melt the solder or brazing metal, and then cooling the tubing to solidify the solder or brazing metal and unite the interfaces.

4. A tubing comprising, a strip of metal stock fashioned substantially into hollow cross sectional form with its edges spaced apart from each other, said strip constituting substantially the entire hollow cross sectional form, a second strip of metal stock, the width of which is narrow relative to the first strip, the second strip being disposed between the edges of the first strip with the width dimension of the second strip extending circumferentially of the hollow cross sectional form and the thickness dimension of the second strip extending radially of the hollow cross sectional form, one edge of the first strip overlapping the second strip on the outside and in interfacial relationship, the other edge of first strip overlapping the second strip on the inside and in interfacial relationship, outer and inner side surfaces of the second strip being exposed thereby forming outside and inside surface portions of the tubular form, the second strip and the overlapping edges of the first strip having a combined thickness substantially equal to the thickness of the first strip, whereby the tubing has substantially smooth inside and outside surfaces, and connections between the interfaces of the two strips comprised of brazing or soldering metal different from the metal of the said two strips of stock.

5. A tubing comprising, a strip of metal stock fashioned substantially into hollow cross sectional form with its edges spaced apart from each other, said strip constituting substantially the entire hollow cross sectional form, a second strip of metal stock, the width of which is narrow relative to the first strip, the second strip being disposed between the edges of the first strip with the width dimension of the second strip extending circumferentially of the hollow cross sectional form and the thickness dimension of the second strip extending radially of the hollow cross sectional form, one edge of the first strip overlapping the second strip on the outside and in interfacial relationship, the other edge of the first strip overlapping the second strip on the inside and in interfacial relationship, outer and inner side surfaces of the second strip being exposed thereby forming outside and inside surface portions of the tubular form, the second strip having a relatively thin central portion engaged on opposite sides by the opposite edges of the first named strip, the second strip and the overlapping edges of the first strip having a combined thickness substantially equal to the thickness of the first strip, whereby the tubing has substantially smooth inside and outside surfaces, and connections between the interfaces of the two strips comprised of brazing or soldering metal different from the metal of the said two strips of stock.

References Cited in the file of this patent

UNITED STATES PATENTS

| | | |
|---|---|---|
| 381,218 | Davidson | Apr. 17, 1888 |
| 684,670 | Boehmler | Oct. 15, 1901 |
| 755,436 | Bentel | Mar. 22, 1904 |
| 807,264 | Greenfield | Dec. 12, 1905 |
| 1,019,043 | Higgin | Mar. 5, 1912 |
| 1,180,859 | Lefever | Apr. 25, 1916 |
| 1,674,109 | Grob | June 19, 1928 |
| 1,783,802 | Lagerblade | Dec. 2, 1930 |
| 2,362,893 | Durst | Nov. 14, 1944 |
| 2,475,566 | Karmazin | July 5, 1949 |

FOREIGN PATENTS

| | | |
|---|---|---|
| 584,413 | Germany | Sept. 19, 1933 |